United States Patent
Ueda

(10) Patent No.: US 8,072,176 B2
(45) Date of Patent: Dec. 6, 2011

(54) DISPLACEMENT SENSING METHOD AND MOTOR CONTROL APPARATUS

(75) Inventor: Shinji Ueda, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 505 days.

(21) Appl. No.: 12/206,797

(22) Filed: Sep. 9, 2008

(65) Prior Publication Data

US 2009/0072774 A1    Mar. 19, 2009

(30) Foreign Application Priority Data

Sep. 14, 2007   (JP) ................ 2007-238695

(51) Int. Cl.
*G05B 1/04* (2006.01)
*G01D 5/245* (2006.01)

(52) U.S. Cl. ...................... 318/671; 318/638

(58) Field of Classification Search ............... 318/466, 318/602, 632, 638, 640, 652, 661, 671
See application file for complete search history.

(56) References Cited

U.S. PATENT DOCUMENTS

| | | | | |
|---|---|---|---|---|
| 4,439,715 | A * | 3/1984 | Taylor | 318/627 |
| 4,617,499 | A * | 10/1986 | Yuasa | 318/400.01 |
| 4,999,558 | A | 3/1991 | Onodera et al. | |
| 5,157,597 | A * | 10/1992 | Iwashita | 700/37 |
| 5,719,789 | A | 2/1998 | Kawamata | |
| 6,049,182 | A * | 4/2000 | Nakatani et al. | 318/432 |
| 6,081,087 | A * | 6/2000 | Iijima et al. | 318/400.13 |
| 6,694,816 | B2 * | 2/2004 | Matsuoka | 73/593 |
| 7,053,815 | B1 * | 5/2006 | Joynson et al. | 342/62 |
| 7,633,256 | B2 * | 12/2009 | Reichert et al. | 318/602 |
| 7,711,508 | B2 * | 5/2010 | Hayashi | 702/94 |
| 7,746,023 | B2 * | 6/2010 | Ajima et al. | 318/700 |

FOREIGN PATENT DOCUMENTS

| | | |
|---|---|---|
| JP | 08-145719 A | 6/1996 |
| JP | 10-254549 A | 9/1998 |
| KR | 910002444 B1 | 4/1991 |

* cited by examiner

*Primary Examiner* — Bentsu Ro

(57) ABSTRACT

A displacement sensing method of the present invention includes the steps of superimposing a predetermined signal on a torque command to supply a drive torque to a motor, measuring an amplitude spectrum ratio between the drive torque in superimposing the predetermined signal on the torque command and a motor angle measured by a displacement sensor, generating correction data for evening out the amplitude spectrum ratio, and correcting the measured motor angle so that the motor angle measured by the displacement sensor is equal to an actual motor angle using the correction data.

14 Claims, 16 Drawing Sheets

DISPLACEMENT SENSING METHOD AND MOTOR CONTROL APPARATUS

BACKGROUND OF THE INVENTION

The present invention relates to a displacement sensing method and a motor control apparatus, more particularly to a displacement sensing method that corrects a measured angle and a motor control apparatus that corrects a measured angle to improve measuring accuracy.

A low output electric motor, which is called a galvano motor, is used for a processing machine such as a laser drilling machine, a laser trimming machine, and a laser repair machine. The galvano motor is required to have an angle sensor with high accuracy. Therefore, an incremental encoder is employed as an angle sensor of the galvano motor.

An optical rotary encoder and linear encoder are known as an incremental encoder. Such encoders sense displacement information such as a displacement amount and a displacement direction of an object to be sensed by using two signals (sine wave signal and cosine wave signal) which have a phase difference of 90° each other.

A lot of conventional encoders corrected amplitude of an output signal, an offset, and a phase to improve measuring accuracy.

For example, Japanese Patent Laid-Open No. 8-145719 describes that an amplitude correction, an offset correction, and a phase correction are performed based on information on the maximum and minimum value of the output signal of the encoder and on the intersection of two-phase output signals. Japanese Patent Laid-Open No. 10-254549 describes that the amplitude correction and the offset correction are performed based on an average value of the maximum values and an average value of the minimum values of the output signal of the encoder.

However, conventional correction means performed the correction on the premise that the output signal of the encoder is an ideal sine wave signal. However, actually, since the output signal of the encoder includes a higher harmonic component or a nonlinear component, it is not an ideal sine wave. Accordingly, even if the conventional correction means correct the output signal of the encoder, the output signal of the encoder is not ideal sine wave signal.

A lot of encoders generate a plurality of split pulses including a phase difference corresponding to a split unit from the sine wave signal and the cosine wave signal in order to improve the sensing resolution of the displacement information of the object to be sensed. Such a method is called an electric split. The fact that the output signal of the encoder is not an ideal sine wave signal caused an error in performing the electric split.

The encoder is processed so that the scale pitches have equal intervals. However, actually, it has a process error.

BRIEF SUMMARY OF THE INVENTION

The present invention provides a displacement sensing method that reduces the measured error caused by the higher harmonic component or the nonlinear component included in the output signal of the encoder and by the process error of the scale pitches, and also provides a motor control apparatus with high accuracy that reduces the measured error.

A displacement sensing method as one aspect of the present invention includes the steps of superimposing a predetermined signal on a torque command to supply a drive torque to a motor, measuring an amplitude spectrum ratio between the drive torque in superimposing the predetermined signal on the torque command and a motor angle measured by a displacement sensor, generating correction data for evening out the amplitude spectrum ratio, and correcting the measured motor angle so that the motor angle measured by the displacement sensor is equal to an actual motor angle using the correction data.

A motor control apparatus as another aspect of the present invention includes a displacement sensor that measures a displacement amount of a motor, a drive unit that supplies a drive torque to the motor, a signal generator that generates a predetermined signal and supplies the predetermined signal to the drive unit, a correction data generator that generates correction data using the drive torque when the predetermined signal is supplied to the drive unit and the displacement amount of the motor measured by the displacement sensor, and a correction unit that corrects the measured displacement amount of the motor so that the displacement amount of the motor measured by the displacement sensor is equal to an actual displacement amount of the motor using the correction data generated by the correction data generator. The drive unit uses a displacement amount corrected by the correction unit to control the motor.

Other aspects of the present invention will be apparent from the embodiments described below with reference to the drawings.

DETAILED DESCRIPTION OF THE PREFERRED EMBODIMENTS

Exemplary embodiments of the present invention will be described below with reference to the accompanied drawings.

Figure 13:
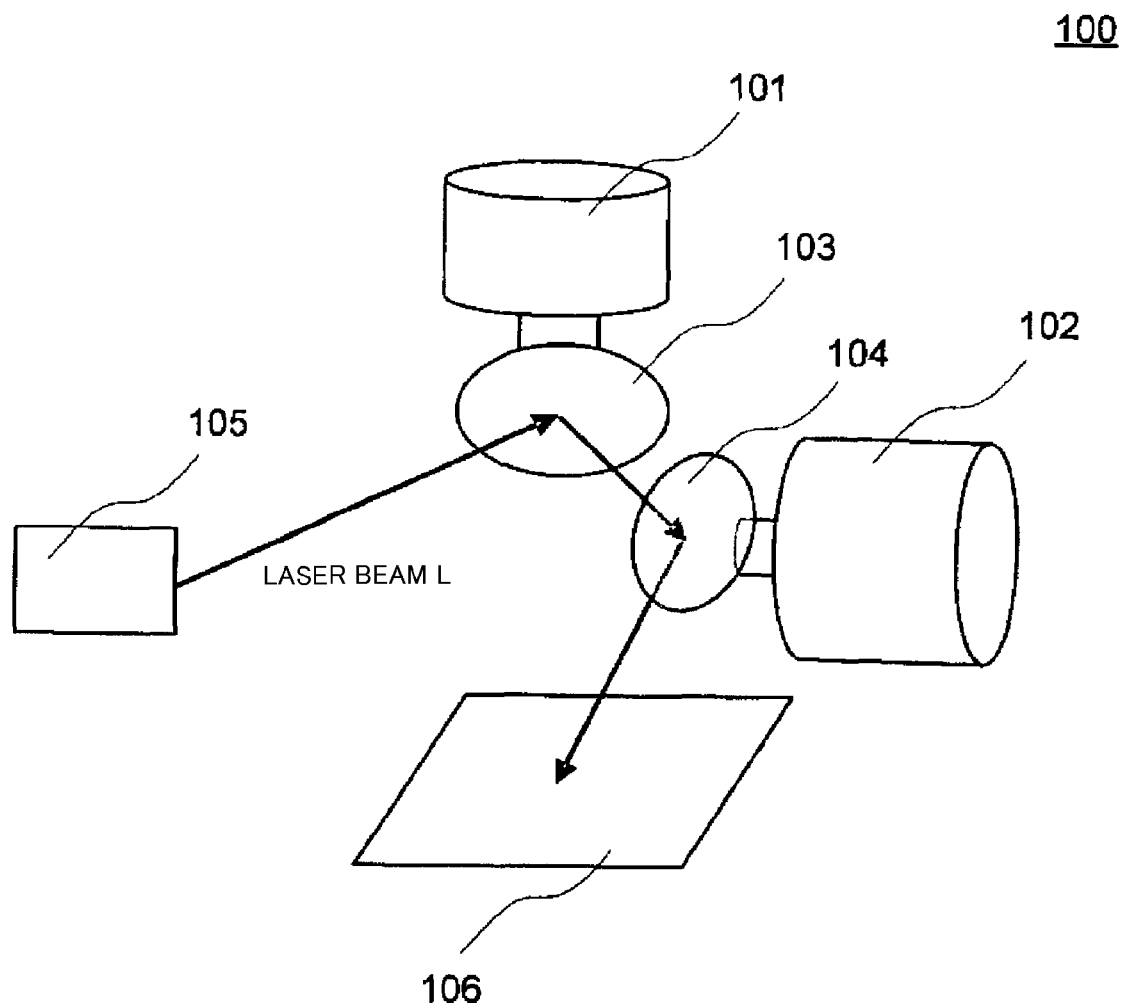
FIG. 13 is a schematic view showing one example of a laser processing machine.

As one example of a processing machine, the configuration of a laser processing machine will be described. FIG. 13 shows a schematic view of a laser processing machine 100. The laser processing machine 100 is used for various purposes such as cutting of a board, drilling a hole in a board, and welding between metals.

The laser processing machine 100 of the present embodiment includes rotary motors 101 and 102. The rotary motors 101 and 102 are provided for rotationally drive mirrors 103 and 104, respectively. The mirrors 103 and 104 are rotationally driven by the rotary motors 101 and 102 to change these directions.

Thus, changing the directions of the mirrors 103 and 104 using the rotary motors 101 and 102 can change the direction of a laser beam L. As described later, each of the rotary motors 101 and 102 is provided with an encoder for measuring a rotational displacement amount of the motor. Measuring precisely a rotational displacement amount of the motor can precisely control the direction of the laser beam L.

The laser beam L emitted from a laser oscillator 105 is irradiated on a laser-processed surface 106 via the mirrors 103 and 104. Various materials such as a metal, a glass, and a plastic, can be selected as the laser-processed surface 106 that is subject to be processed.

As described above, the laser processing machine 100 can accurately control the direction of the laser beam L by rotating the mirrors 103 and 104. Therefore, the laser-processed surface 106 can be accurately processed.

Figure 14:
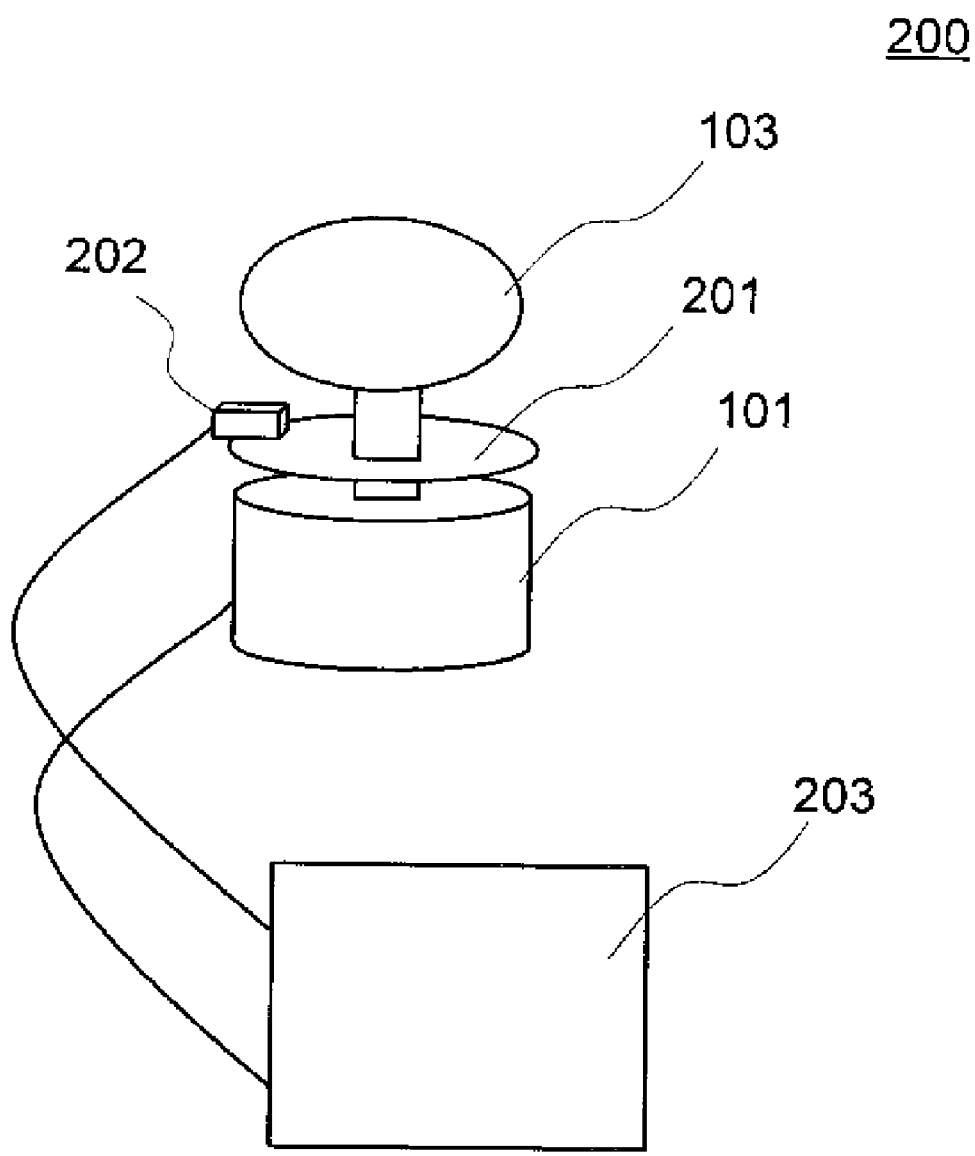
FIG. 14 is a schematic view showing one example of a motor control apparatus.
Figure 15:
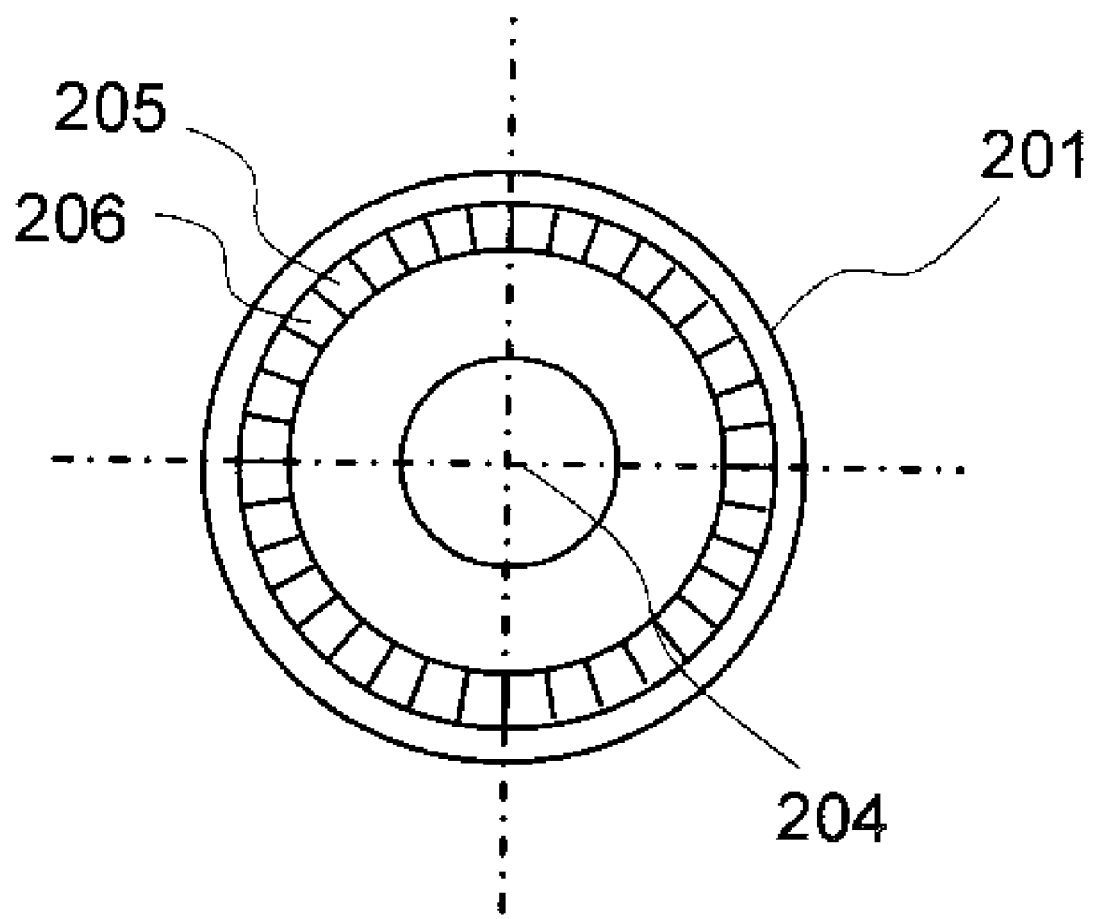
FIG. 15 is a plan view showing one example of a scale of a rotary encoder.

Next, the configuration of a motor control apparatus that is used for a laser processing machine 100 will be described. FIG. 14 shows a schematic view of a motor control apparatus. FIG. 15 shows a schematic plan view of a scale 201 of an encoder.

A motor control apparatus 200 of the present embodiment includes an optical encoder for sensing the amount of the rotational displacement of a rotary motor 101. The encoder includes a scale 201 that has a rotational slit circular disc and a fixed slit circular disc, and a sensor 202 that has a light-emitting element (a light-emitting diode) and a light-receiving element (a photodiode). The rotational slit circular disc rotates with the rotation of the rotary motor 101. On the other hand, the fixed slit circular disc is fixed. The encoder is configured so that the rotational slit circular disc and the fixed slit circular disc are placed between the light-emitting element and the light-receiving element.

The rotational slit circular disc and the fixed slit circular disc are provided with a lot of slits. Light of the light-emitting element is transmitted or is cut off by the rotation of the rotational slit circular disc. Furthermore, since the fixed slit circular disc converts the output signal of the encoder into a plurality of phases, the fixed slit is divided into a plurality of slits. Therefore, the encoder is provided with a plurality of the light-emitting elements and the light-receiving elements.

Figure 16:
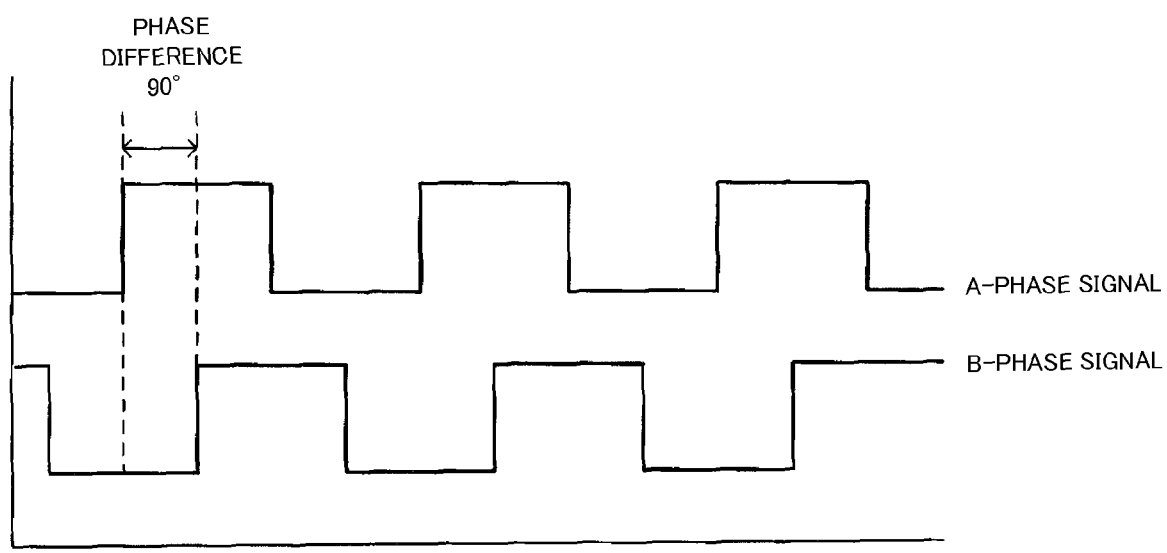
FIG. 16 is a diagram showing an A-phase signal and a B-phase signal of encoder outputs.

As shown in FIG. 15, the scale 201 of the encoder is provided with slits of an A-phase pattern 205 and a B-phase pattern 206. The scale 201 rotates around a rotation axis 204. In rotating, when light from the light-emitting element transmits each of the slits of the A-phase pattern and the B-phase pattern, each of the two light-receiving elements senses the light of the light-emitting element. Therefore, as shown in FIG. 16, the encoder generates the A-phase signal and the B-phase signal whose phases are 90° different from each other. The A-phase signal and the B-phase signal of FIG. 16 are square wave signals that have been formed by waveform shaping of the encoder output of the sine waveform using a waveform shaping circuit.

A motor controller 203 controls the rotary drive of the rotary motor 101. The motor controller 203 compares a motor rotational angle that is a target angle with a motor measured angle that is a measured angle, and performs a feedback control so that the measured angle is equal to the target angle. Therefore, the direction of the mirror 103 can be changed to the angle that corresponds to the target angle.

The sensing principle is not limited to an optical method, other principles such as a magnetic method can also be employed.

Embodiment 1

Figure 1:
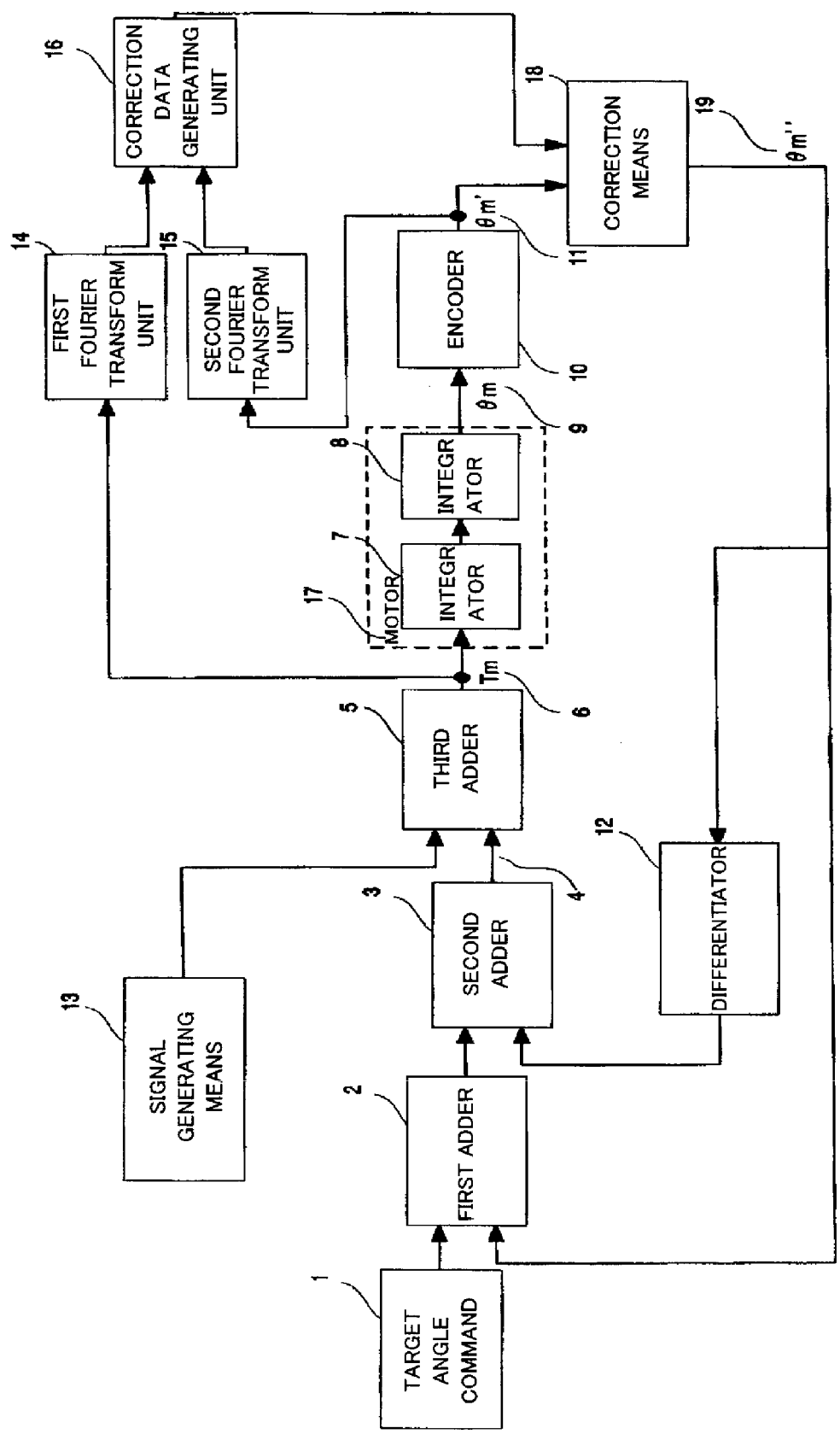
FIG. 1 is a control block diagram of a motor control apparatus in embodiment 1.

Next, a displacement sensing method and a motor control apparatus in embodiment 1 of the present invention will be described. FIG. 1 is a block diagram of a control which a controller of a motor control apparatus performs.

The control block in FIG. 1 is a positioning control system in which a rotary encoder is used as an angle sensor for measuring a rotational angle θm of a motor. The figure shows a simple motor model in which a positioning response with respect to a torque command is $1/s^2$, and a positioning control system of a proportional control that performs a position and velocity feedback.

Reference numeral 1 denotes a target angle command. The target angle command 1 commands a target angle of a rotational angle θm outputted from a motor 17. Reference numeral 2 denotes a first adder. The first adder 2 feeds back a correction angle 19 outputted from a correction means 18 (a correction unit) to add the target angle by the target angle command 1 and the correction angle 19. Reference numeral 3 denotes a second adder. The second adder 3 adds an output signal of the first adder 2 and a velocity feedback signal outputted from a differentiator 12.

Reference numeral 4 denotes a torque command. The torque command 4 is calculated by passing the target angle command 1 through the first adder 2 and the second adder 3. Reference numeral 5 denotes a third adder. The third adder 5 superimposes a sin wave signal generated by a signal generating means 13 (a signal generator) on the torque command 4. Reference numeral 6 denotes a drive torque. The drive torque 6 is outputted from the third adder 5 and is supplied to the motor 17. Thus, the third adder 5 has a function as a drive means (a drive unit) that supplies the drive torque 6 to the motor 17.

Reference numeral 17 denotes a motor. The motor 17 is provided with integrators 7 and 8, and outputs the rotational angle 9 (θm) of the motor 17. The motor 17 of the present embodiment includes two integrators 7 and 8 because the motor model in which a position response for the torque command 4 is 1/s2 is applied to the embodiment.

The rotational angle 9 (θm) that is a replacement amount of the motor 17 indicates an actual rotational angle of the motor 17. In other words, the rotational angle 9 (θm) is an actual replacement amount of the motor 17. Thus, it is different from a measured angle that is measured by an encoder.

Reference numeral 10 denotes an encoder. The encoder 10 is a displacement sensing means (a displacement sensor) that senses an actual rotational angle 9 (θm) of the motor 17. Reference numeral 1 denotes a measured angle (θm') The measured angle 11 (θm') is a displacement amount (angle) measured by the encoder 10 which is a displacement sensing means. The encoder 10 senses the actual rotational angle 9 (θm) of the motor 17 to calculate the measured angle 11 (θm') of the motor 17. The sine wave signal outputted from the encoder 10 includes a higher harmonic component. There is also a possibility that the scale of the encoder 10 has process errors. Therefore, strictly speaking, the measured angle 11 (θm') of the motor 17 measured by the encoder 10 is different from the actual rotational angle 9 (θm) of the motor 17. In other words, there is an error between the actual rotational angle 9 (θm) and the measured angle 11 (θm') of the motor 17 measured by the encoder 10.

Reference numeral 12 denotes a differentiator. The differentiator 12 differentiates a corrected angle 19 (θm") corrected by the correction means 18 with respect to time to obtain the rotational velocity of the motor 17. The rotational velocity obtained by the differentiator 12 is inputted to the second adder 3 as a velocity feedback signal.

Reference numeral 13 denotes a signal generating means (a signal generator). The signal generating means 13 of the present embodiment generates a sine wave signal that has a predetermined amplitude and frequency, and supplies the sine wave signal to the third adder 5 that is a drive means. Although the signal generating means 13 of the present embodiment generates a sine wave signal, instead, it can generate another signal such as a Gaussian noise or a triangle wave to supply to the third adder 5.

Reference numeral 14 denotes a first Fourier transform unit. The first Fourier transform unit 14 inputs the drive torque 6 outputted from the third adder 5 to perform a Fourier transform of the drive torque 6. The first Fourier transform unit 14 outputs a first amplitude spectrum as a result of performing the Fourier transform of the drive torque 6.

Reference numeral 15 denotes a second Fourier transform unit. The second Fourier transform unit 15 inputs the measured angle 11 (θm') of the motor 17 obtained based on the output signal of the encoder 10 to perform a Fourier transform of the measured angle 11 (θm'). The second Fourier transform unit 15 outputs a second amplitude spectrum as a result of performing the Fourier transform of the measured angle 11 (θm").

Reference numeral 16 denotes a correction data generating means (a correction data generator). The correction data generating means 16 calculates an amplitude spectrum ratio of a first amplitude spectrum and a second amplitude spectrum. The correction data generating means 16 generates correction data W[n] based on the amplitude spectrum ratio. In other words, the correction data generating means 16 generates the correction data based on the drive torque 6 and the measured angle (θm') measured by the encoder 10 when a predetermined sine wave signal is supplied to the third adder 5.

Reference numeral 18 denotes a correction means (a correction unit). The correction means 18 corrects the measured angle 11 (θm') of the motor 17 measured by the encoder 10 using correction data W[n] generated by the correction data generating means 16. The correction means 18 corrects the measured angle 11 (θm') by the encoder 10 that is a displacement sensing means (a displacement sensor) so as to be equal to the actual rotational angle 9 (θm) of the motor 17. Therefore, the corrected angle 19 corrected by the correction means 18 has a value that is extremely close to the actual rotational angle (θm) of the motor 17. The corrected angle 19 is fed back to the first adder 2 and the second adder 3.

Next, errors of the measured angle that occurs in the control block in FIG. 1 and a method of correcting the errors will be described in detail.

Firstly, an error that the encoder signal including a higher harmonic component causes with respect to the measured angle (θm') of the motor will be described. The present embodiment uses a rotary encoder as an angle sensor of a rotary motor. The encoder has a function as a displacement sensing means of the motor.

The encoder outputs each of two-phase sine wave signals in 140000 cycles per every rotation of the motor. When the rotational angle of the motor is θm [rad], a phase angle θe is expressed by equation 1.

[Equation 1]

$$\theta_e = 140000 \times \theta_m \quad (1)$$

Two-phase signals Asig and Bsig of the encoder that outputs ideal sine waves is expressed by equations 2 and 3, respectively.

[Equation 2]

$$Asig = \sin\left(\theta_e + \frac{\pi}{2}\right) \quad (2)$$

[Equation 3]

$$Bsig = \sin\theta_e \quad (3)$$

In the embodiment, the encoder signals are regarded as including three-order and five-order higher harmonics as expressed by equations 4 and 5.

[Equation 4]

$$Asig5 = \sin\left(\theta_e + \frac{\pi}{2}\right) + 0.05\sin3\left(\theta_e + \frac{\pi}{2}\right) + 0.01\sin5\left(\theta_e + \frac{\pi}{2}\right) \quad (4)$$

[Equation 5]

$$Bsig5 = \sin\theta_e + 0.05\sin3\theta_e + 0.01\sin5\theta_e \quad (5)$$

In the embodiment, the encoder signal including the higher harmonics is regarded as an ideal sine wave signal, the error that occurs in performing electric split by arc tangent method (tan$^{-1}$). The phase angle θe' of the encoder is calculated by equation 6 using the encoder signal including higher harmonics.

[Equation 6]

$$\theta'_e = \tan^{-1}\left(\frac{Bsig5}{Asig5}\right) \quad (6)$$

The measured angle θm' [rad] of the motor is expressed by equation 7 using the phase signal θe' of the encoder.

[Equation 7]

$$\theta'_m = \frac{\theta'_e}{140000} \quad (7)$$

Figure 2:
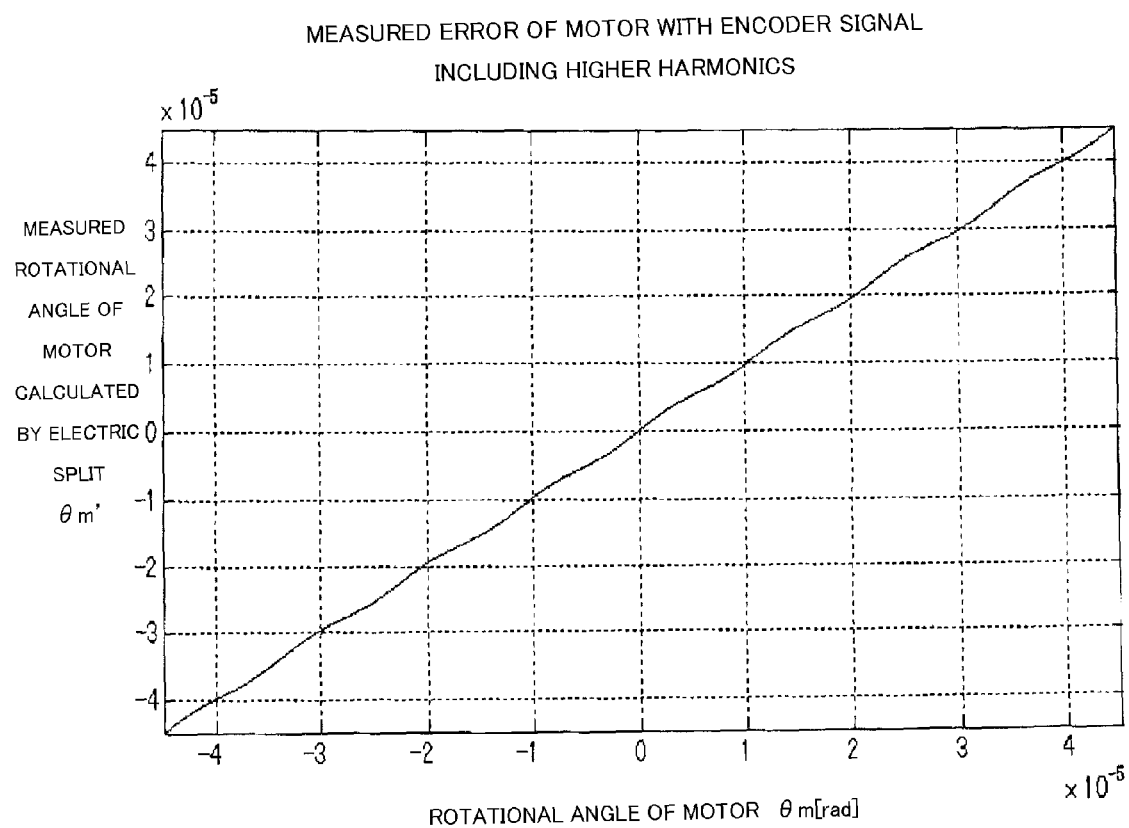
FIG. 2 is a diagram showing a relationship between a rotational angle θm of a motor and a measured angle θm' by an encoder in embodiment 1.

Since the encoder is a periodic function, the phase angle θe of the encoder can be regarded as the range of $-\pi \leq \theta e \leq \pi$ FIG. 2 shows the relationship between the measured angle θm' of the motor and the rotational angle θm of the motor. In FIG. 2, the horizontal axis indicates the rotational angle θm of the motor and the vertical axis indicates a measured angle θm' of the motor calculated by the electric split. In case that the measured error is ideally zero, the graph shown in FIG. 2 is linear. However, since the actual measured angle includes errors, the graph shown in FIG. 2 is distorted line.

Figure 3:
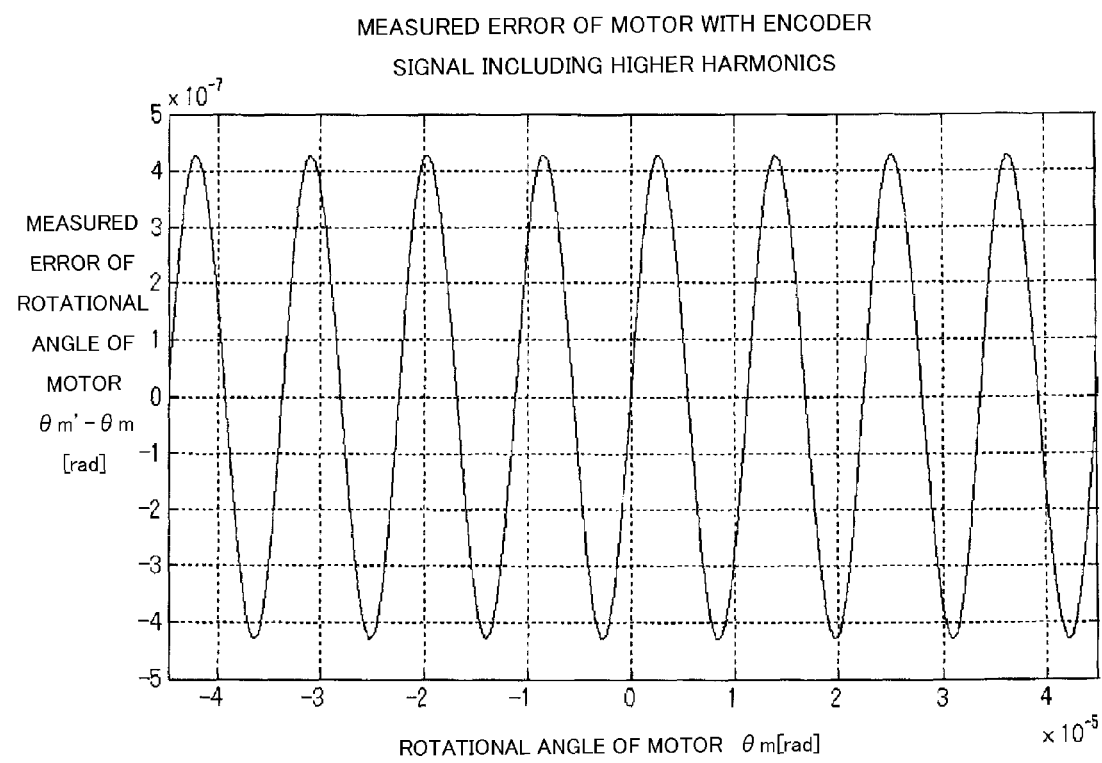
FIG. 3 is a diagram showing a relationship between a rotational angle θm of a motor and a measured error θm'−θm in embodiment 1.

FIG. 3 shows a relationship between the measured error θm'−θm and the rotational angle θm of the motor. In FIG. 3, the horizontal axis indicates the rotational angle θm of the motor and the vertical axis indicates the measured error θm'−θm between the rotational angle θm of the motor and the measured angle θm' of the motor calculated by the electric split. In case that the measured error is ideally zero, the measured error θm'−θm of the vertical axis always indicates zero without depending on the rotational angle θm of the horizontal axis. However, since the actual measured angle includes errors, the graph shown in FIG. 3 sinusoidally varies.

As described above, the measured error occurs between the actual rotational angle θm of the motor and the measured angle θm' measured by the encoder caused by a higher harmonic component of the encoder output.

Figure 12:
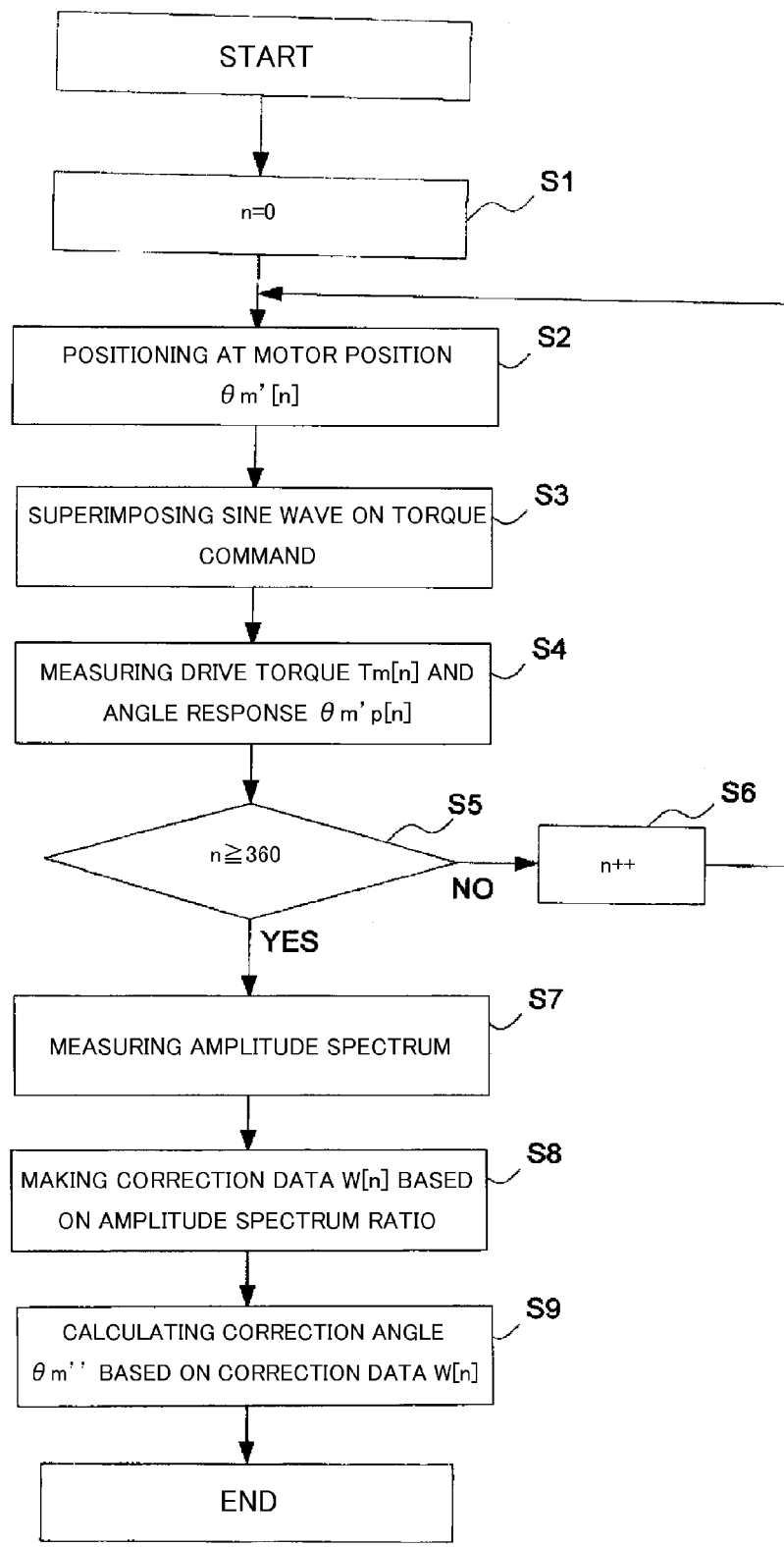
FIG. 12 is a flowchart showing a correction procedure in embodiment 1.

Next, a method of correcting the measured angle θm' that is measured by the encoder will be described with reference to a flowchart of a correction procedure shown in FIG. 12. The correction procedure of the present embodiment is performed with the encoder mounted on the motor.

The motor control apparatus of the present embodiment has a correction mode for correcting the measured angle of the encoder and a control mode that performs the actual motor control. The motor control apparatus corrects the measured angle in the correction mode before moving to the control mode in which the normal motor control is performed.

The control system shown in FIG. 1 measures the measured angle θm' of the motor by the encoder to perform the positioning control of the motor. In the embodiment, correction coefficients are calculated at 360 points as expressed by equation 8.

[Equation 8]

$$\theta'_m[n] = \frac{2\pi}{360} \times \frac{n-180}{140000} \quad (n = 0, 1, \ldots 358, 359) \tag{8}$$

Firstly, in equation 8, the encoder measures the position (angle) satisfying θm'[0]=−π/140000 (n=0) (Step S1). Then, the control system performs the positioning control so that the motor is at this position (Step S2). Next, in the condition of the positioning control, the control system superimposes the sine wave signal of 100 Hz that has been generated by the signal generating means 13 on the torque command 4 (Step S3). The sine wave frequency is not limited to 100 Hz, but another frequency can also be used.

Based on the result, the control system supplies the drive torque 6 outputted from the third adder 5 to the motor 17 to measure the drive torque 6 and the angle response of the measured angle θm' (Step S4). In this case, the drive torque is expressed by Tm[0] and the angle response of the measure angle θm' of the motor is expressed by θm'p[0].

The control system determines whether or not the value of n is smaller than 360 (Step S5). If the value of n is smaller than 360, the control system adds 1 to n (Step S6) and repeats the process of Steps S2 to S4. In other words, when n is 1, 2, . . . , 358, 359 (n<360), as well as n is 0, the control system calculates the drive torque Tm[n] of the motor and the angle response θm'p[n] of the measured angle θm' (Step S4).

Figure 4:
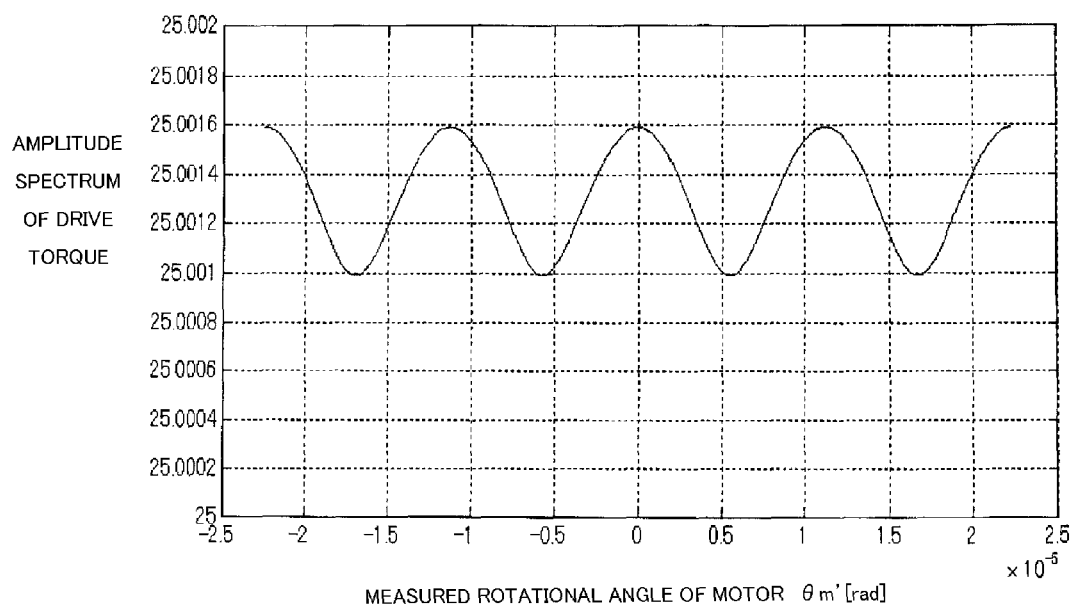
FIG. 4 is a diagram showing an amplitude spectrum of a drive torque Tm of a motor in embodiment 1.
Figure 5:
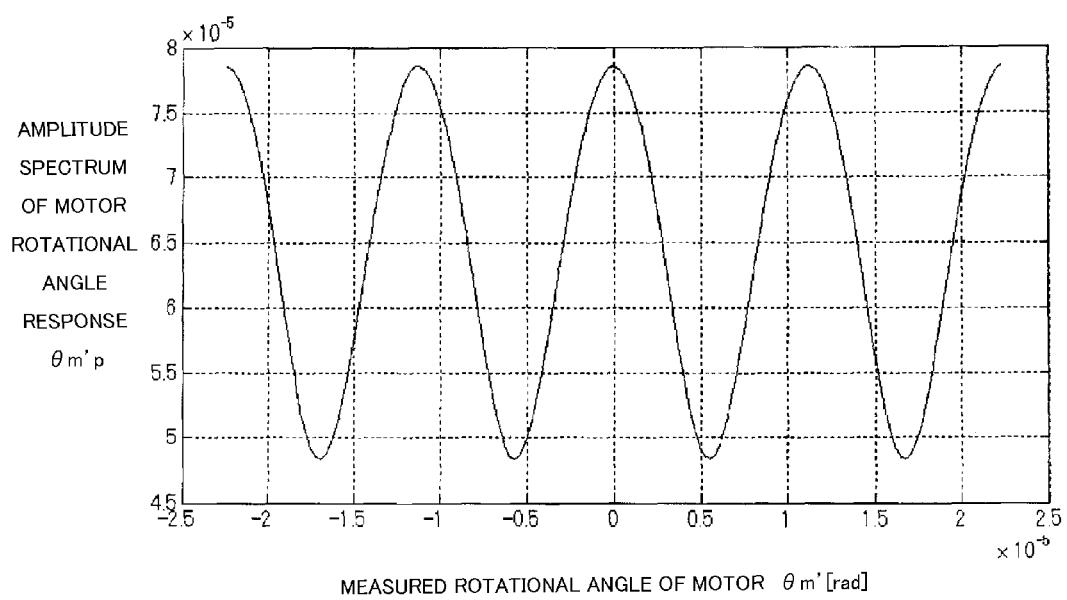
FIG. 5 is a diagram showing an amplitude spectrum of an angle response θm'p of a measured angle θm' of a motor in embodiment 1.

If the value of n reaches 360, the control system performs the Fourier transform of each of the drive torque Tm of the motor and the angle response θm'p to calculate each of the amplitude spectra (Step S7). FIG. 4 shows an amplitude spectrum of the drive torque Tm of the motor. FIG. 5 shows an amplitude spectrum of the angle response θm'p. Each of the amplitude spectra shown in FIGS. 4 and 5 merely represents a term of superimposed frequency 100 Hz of the sine wave signal.

If there is no measured error by the encoder, the angle response θm'p of the measured angle θm' of the motor 17 is constant with respect to the drive torque Tm. In other words, the amplitude spectrum of the angle response with respect to the amplitude spectrum of the drive spectrum (an amplitude spectrum ratio) is constant.

However, actually, a measured error by the encoder occurs. Therefore, as shown in FIGS. 4 and 5, the amplitude spectrum ratio is not constant when the measured angle θm' is used.

Therefore, when the measured error occurs, the control system makes correction data W[n] to even out the amplitude spectrum ratio (Step S8). The correction data W[n] is a weighting data when the measured angle θm' is θm'[n]≦θm'<θm'[n+1], and is calculated so as to satisfy equations 9 and 10 described below.

[Equation 9]

$$\frac{W[n] \times DFT(\theta'_m p[n])}{DFT(Tm[n])} = K \tag{9}$$

[Equation 10]

$$\sum_{n=0}^{359} (W[n] \times (\theta m'[n+1] - \theta m'[n])) = \frac{2\pi}{140000} \tag{10}$$

Figure 6:
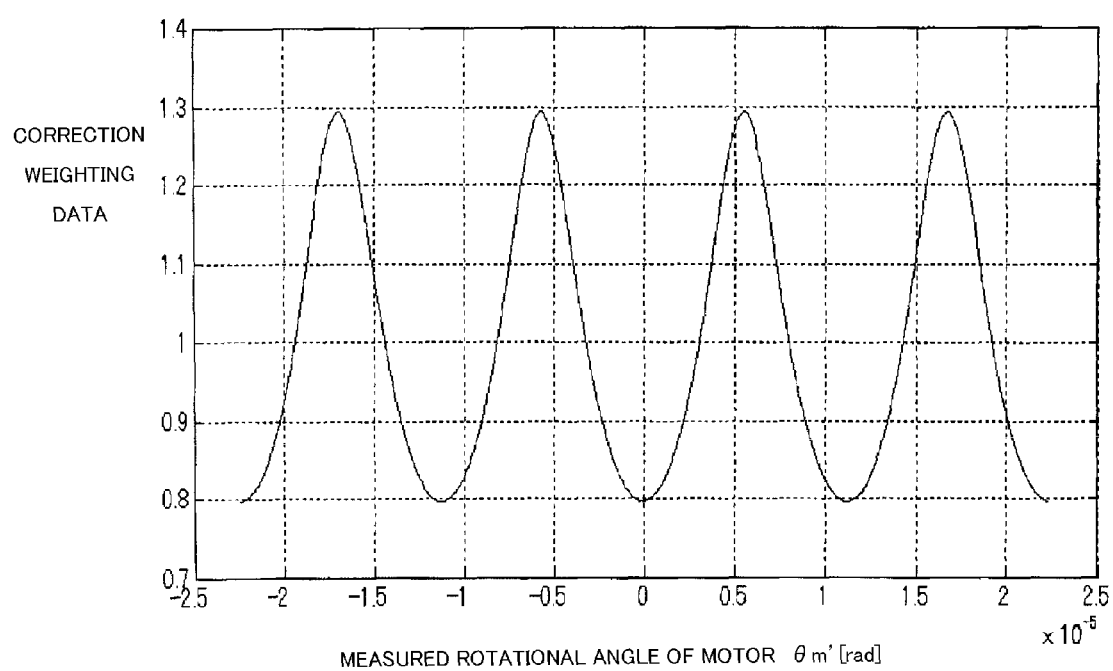
FIG. 6 is a diagram showing correction data in embodiment 1.

K in equation 9 is an arbitrary constant number. DFT (θm'p) is an amplitude spectrum (the term of 100 Hz) calculated by Fourier transform of the angle response θm'p of the measured angle θm'. DFT (Tm) is an amplitude spectrum (the term of 100 Hz) calculated by Fourier transform of the drive torque Tm. FIG. 6 shows the relationship between the correction data W and the measured angle θm'. The control system performs the correction using such correction data W to even out the amplitude spectrum ratio of the drive torque Tm and the angle response θm'p. The measurements of the amplitude spectra and the amplitude spectrum ratio can also be performed immediately after the measurements of the drive torque Tm[n] and the angle response (θm'p[n]) (Step S4 in FIG. 12).

The corrected angle θm" to which the measured angle θm' is corrected is calculated using the correction data W[n] (Step S9). When the measured angle θm' satisfies (2π/360)×(n−180)/140000≦θm'<(2π/360)×(n−180)/140000, the corrected angle θm" is expressed by equation 11.

[Equation 11]

$$\theta m'' = \sum_{k=1}^{n} (W[k-1] \times \theta m'[k]) + W[n] \times (\theta m'[n+1] - \theta m'[n]) \tag{11}$$

Figure 7:
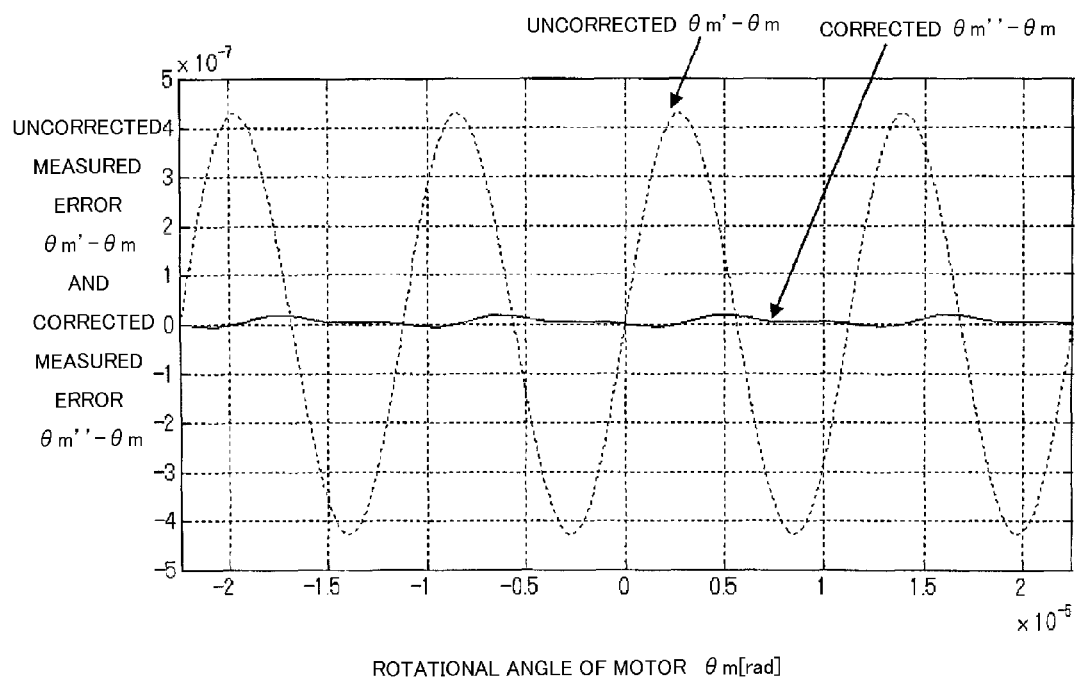
FIG. 7 is a diagram showing an uncorrected measured error θm'−θ and a corrected measured angle θm"−θ in embodiment 1.

FIG. 7 shows the corrected measured error θm"−θm and the uncorrected measured error θm'−θm with respect to the rotational angle θ of the motor. In FIG. 7, the horizontal axis indicates the rotational angle θm of the motor and the vertical axis indicates the measured error. The measured error θm'−θm between the rotational angle θm of the motor and the uncorrected measured angle θm' is indicated by a dashed line, and the measured error θm"−θm between the rotational angle θm of the motor and the corrected measured angle θm" is indicated by a solid line.

As shown in FIG. 7, the uncorrected measured error θm'−θm is large. However, the corrected measured error θm"−θm is extremely small. In other words, the corrected angle θm" calculated using the correction data W is extremely close to the actual rotational angle θm of the motor.

As described above, the displacement sensing method of the present embodiment sequentially performs the measurements of the amplitude spectra at a plurality of the measured angles in the range to be corrected among the measured angles θm' of the motor. Then, the correction of the measured angle θm' is performed so that the positioning response of each of the measured angles θm' is constant with respect to the arbitrary drive torque in the range to be corrected.

After the motor control apparatus calculates the corrected angle θm" in the correction mode, it moves to the control mode in which the motor control apparatus performs a normal motor control. In the control mode, the third adder 5 that is a drive means of the motor control apparatus performs a drive control of the motor 17 using the corrected angle θm" calculated in the correction mode.

As described above, the present embodiment can effectively reduce the measured error with respect to the output signal of the encoder including the higher harmonic signal, using the correction data W to even out the amplitude spectrum ratio. Therefore, the present embodiment can provide a displacement sensing method that reduces the error by the higher harmonic component included in the output signal of the encoder. Furthermore, the present embodiment can provide a motor control apparatus with high accuracy since the motor control apparatus corrects the measured angle of the encoder so that the measured error of the encoder is small.

Embodiment 2

In the present embodiment, a scale pitch of an encoder has a process error. The present embodiment uses a rotary encoder as an angle sensor mounted on a rotary motor, which is the same as embodiment 1.

As in the case of embodiment 1, the encoder of the present embodiment outputs each of two-phase sine wave signals in 140000 cycles per rotation of a motor. When the actual rotational angle of the motor is θm[rad], the phase angle θe is expressed by equation 12, which is the same as equation 1.

[Equation 12]

$$\theta_e = 140000 \times \theta_m \quad (12)$$

Furthermore, two-phase sine wave signals Asig and Bsig of the encoder are expressed by equations 13 and 14, which are the same as equations 2 and 3, respectively.

[Equation 13]

$$Asig = \sin\left(\theta_e + \frac{\pi}{2}\right) \quad (13)$$

[Equation 14]

$$Bsig = \sin\theta_e \quad (14)$$

However, if the scale pitch has a process error, the relation of equation 1 is not satisfied and the accurate position can not be measured. In the present embodiment, the correction procedure that corrects the measured angle θm of the motor in case that the scale pitch has the process error as described above will be described.

Firstly, the error that the output signal of the encoder having a process error in the scale pitch provides the measured angle of the motor will be described.

The scale of the present embodiment is regarded as satisfying equations 15 and 16 with respect to the rotational angle θm of the motor. When the range of the rotational angle of the motor is (−π/140000)×1.2<θm<0, the phase angle θe' of the encoder is expressed by equation 15.

[Equation 15]

$$\theta'_e = \frac{\theta_m \times 140000}{1.2} \quad (15)$$

When the range of the rotational angle of the motor is 0≦θm<(−π/140000)×0.8, the phase angle θe' of the encoder is expressed by equation 16.

[Equation 16]

$$\theta'_e = \frac{\theta_m \times 140000}{0.8} \quad (16)$$

In this case, the encoder of the present embodiment has a process error that satisfies a relation of equations 15 and 16. The scale is regarded as having no process error other than the above range. When the output signal of the encoder is ideal and does not include a higher harmonic, the measured angle θm' is expressed by equation 17.

[Equation 17]

$$\theta'_m = \frac{\theta'_e}{140000} \quad (17)$$

Figure 8:
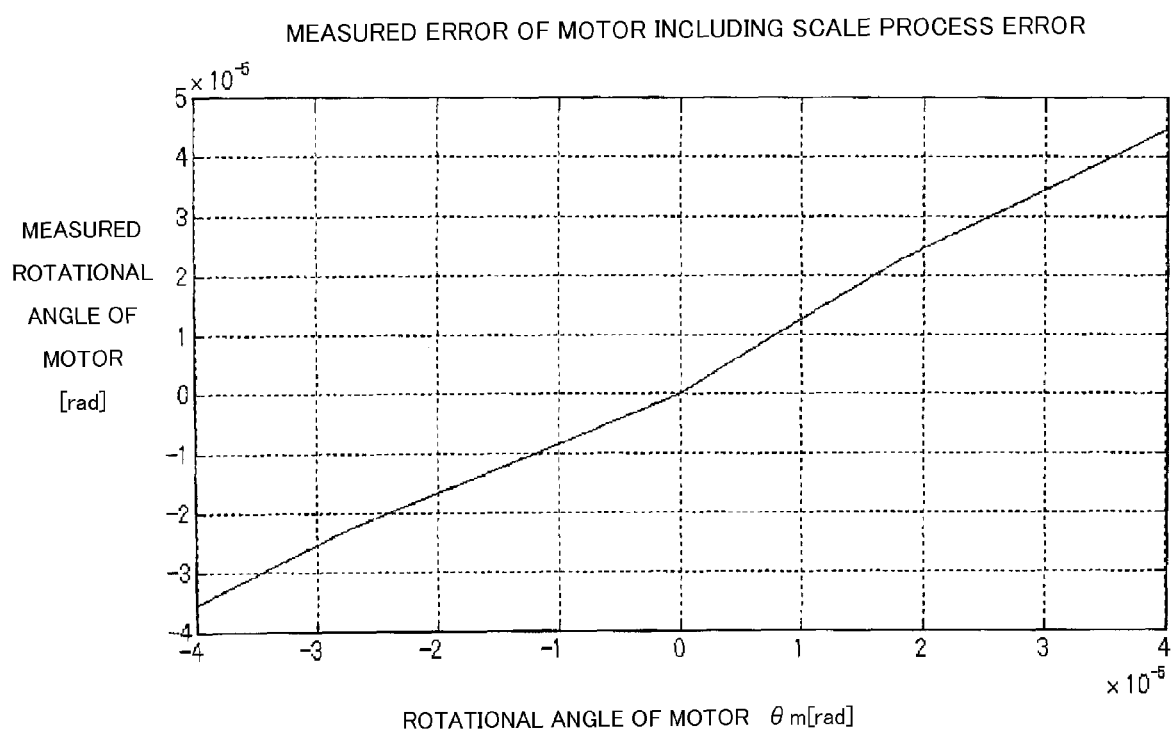
FIG. 8 is a diagram showing a relationship between a rotational angle θm of a motor and a measured angle θm' in embodiment 2.

FIG. 8 shows the relationship between the measured angle θm' of the motor and the rotational angle θm of the motor. In FIG. 8, the horizontal axis indicates a rotational angle θm of the motor and the vertical axis indicates a measured angle θm' measured by the encoder including a scale process error. If the process error is ideally zero, the graph shown in FIG. 8 is linear. However, since the scale of the present embodiment has a process error that satisfies equations 15 and 16, the graph shown in FIG. 2 is a distorted line.

Figure 9:
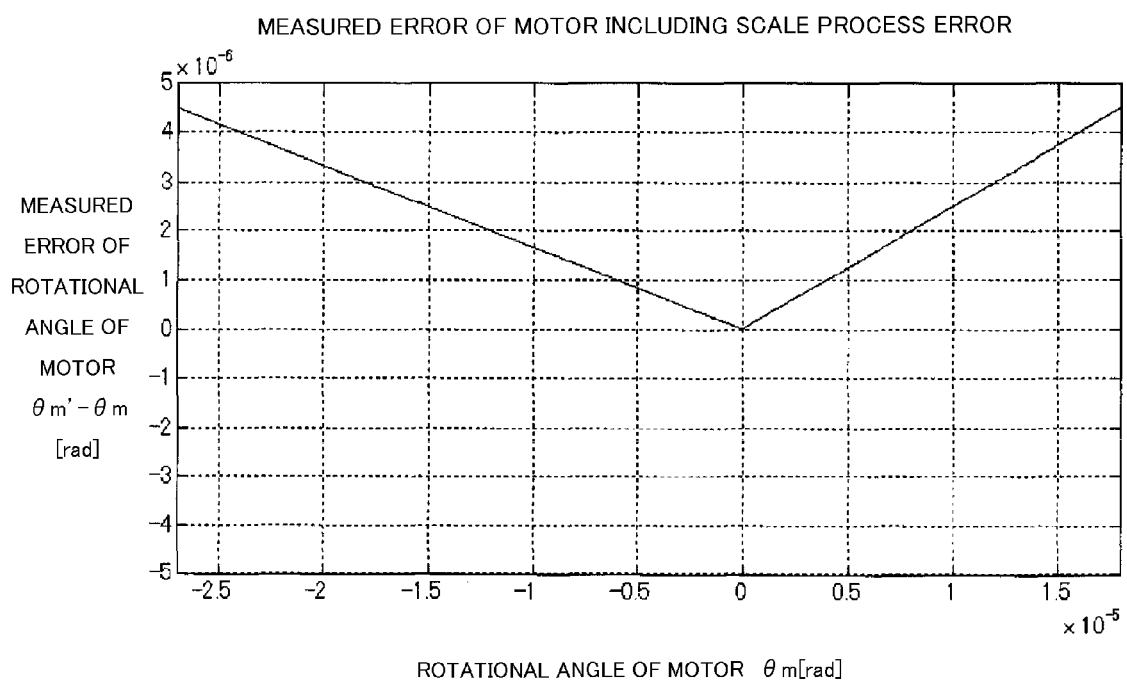
FIG. 9 is a diagram showing a relationship between a rotational angle θm of a motor and a measured error θm'−θm in embodiment 2.

FIG. 9 shows the relationship between the measured error θm'−θm by the encoder that has a process error and the rotational angle θm of the motor. In FIG. 9, the horizontal axis indicates a rotational angle θm of the motor, and the vertical axis indicates a measured error θm'−θm between the rotational angle θm of the motor and the measured angle θm' of the motor measured by the encoder that has a scale process error. If the process error is ideally zero, the measured error θm'−θm of the vertical axis always indicates zero without depending on the rotational angle θm of the vertical axis. However, actually, since there is a process error, it changes as shown in FIG. 9.

Next, a correction method of a measured error θm'−θm that is caused by a process error of the scale will be described. The correction method is the same as that of embodiment 1. Firstly, the correction method superimposes a sine wave signal of 100 Hz on a torque command to a motor in a condition of a positioning control. Then, it applies a drive torque on which the sin wave signal is superimposed to the motor, and measures a drive torque Tm and an angle response θm'p of the motor. After that, it makes correction data using equations 8 to 10.

Figure 10:
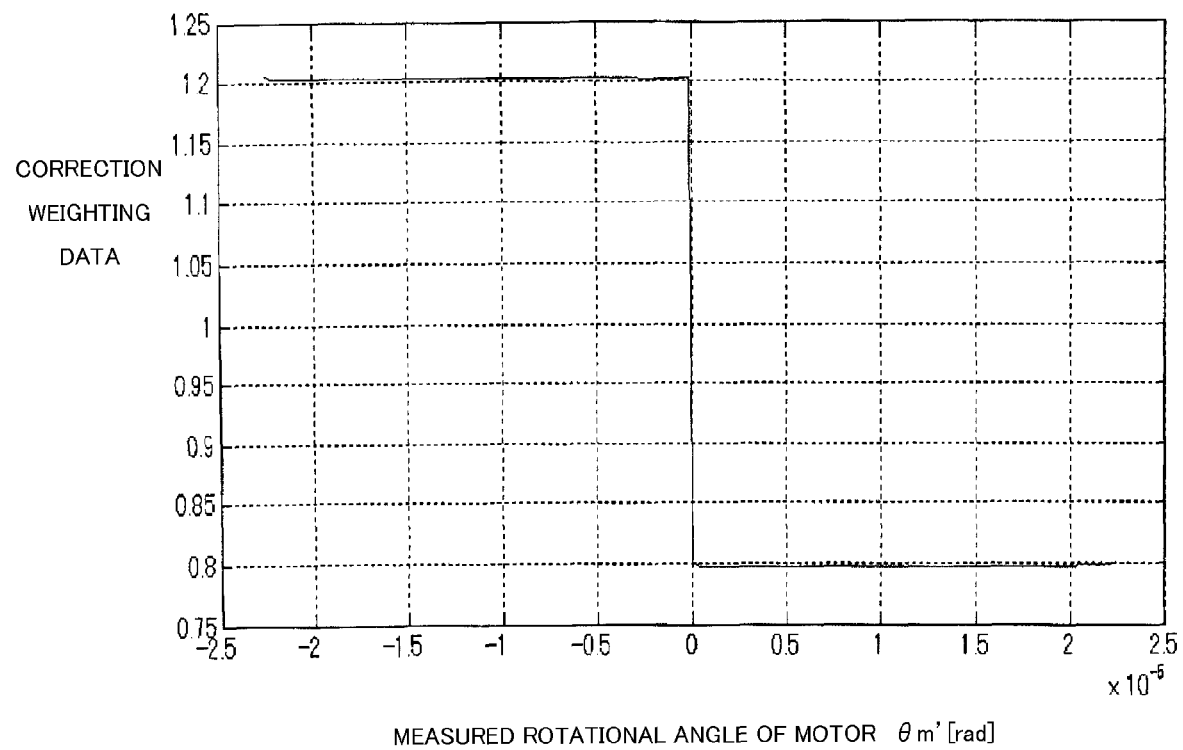
FIG. 10 is a diagram showing correction data in embodiment 2.

FIG. 10 shows correction data W made in the present embodiment. The vertical axis indicates correction data W and the horizontal axis indicates a measured angle θm'. Since the process error of the scale in the present embodiment satisfies equations 15 and 16, the correction data W shows 1.2 when the measured angle θm' is smaller than 0. Meanwhile, the correction data W shows 0.8 when the measured angle θm' is 0 or larger.

Next, a correction angle θm" to which a measured angle θm" is corrected using the correction data W will be described.

Figure 11:
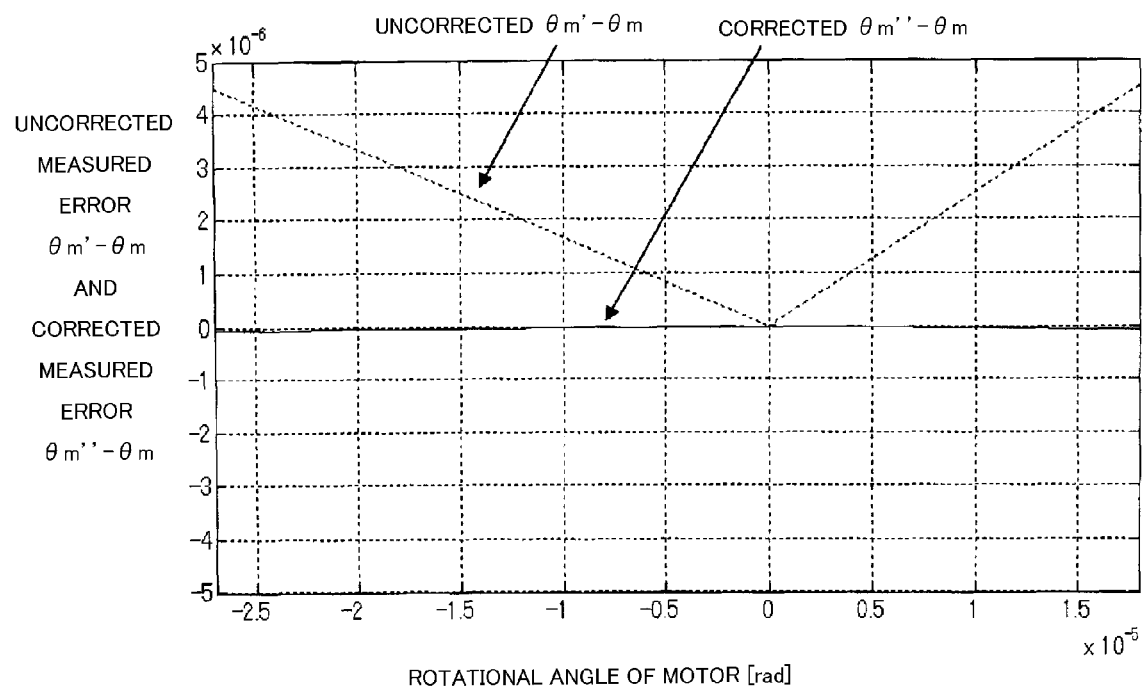
FIG. 11 is a diagram showing an uncorrected measured error θm'−θ and a corrected measured angle θm"−θ in embodiment 2.

FIG. 11 shows a corrected measured error θm"−θm and a uncorrected measured angle θm'−θm with respect to a rotational angle θ of the motor. In FIG. 11, the horizontal axis indicates a rotational angle θ, and the vertical axis indicates a measured error. The measured error θm'−θm between the rotational angle θm and the uncorrected measured angle θm' is indicated by a dashed line, and the measured error θm"−θm between the rotational angle θm of the motor and the corrected measured angle θm" is indicated by a solid line.

As shown in FIG. 11, the uncorrected measured error θm'−θm is large. However, the corrected measured error θm"−θm is extremely small. In other words, the corrected angle θm" calculated using the correction data W is extremely close to the actual rotational angle θm.

After the motor control apparatus calculates the corrected angle θm" in the correction mode, it moves to the control mode in which a normal motor control is performed. In the control mode, the third adder 5 that is a drive means of the motor control apparatus performs a drive control of the motor 17 using the corrected angle θm" calculated in the correction mode.

As described above, according to the present embodiment, the measured error caused by the scale process error of the encoder can effectively be reduced using the correction data W so that an amplitude spectrum ratio is constant. Therefore, the displacement sensing method that reduces the measured error caused by the scale process error can be provided. Furthermore, a motor control apparatus with high accuracy can be provided by correcting the measured angle of the encoder based on the scale process error.

As described above, the present invention was specifically described based on the embodiments. However, the present invention is not limited to these embodiments and various variations and modifications may be made without departing from the scope of the present invention.

For example, in embodiments 1 and 2, although a rotational mechanism is used as a movable mechanism, it can also be replaced with a translation mechanism. Therefore, the present invention can be applied to both a rotary encoder and a linear encoder. Although a motor is used as a movable mechanism, it can also be replaced with an actuator such as a piezo actuator.

Although an encoder is used as a displacement sensing means, it can also be replaced with a capacitance sensor or PSD (Position Sensitive Detector). If the capacitance sensor or PSD is used, a linearity correction of the displacement sense can be performed.

A first or more differential value or integration value of the drive force or the displacement amount can be used so that the relationship of the displacement amount with the drive force is constant.

In embodiment 2, even if the scale pitch of the encoder is inhomogeneous, the displacement correction can be performed by setting an angle or position range including the inhomogeneous part and calculating a correction weighting coefficient.

According to the positioning apparatus of the galvano motor using the correction method of the above embodiments, or the laser processing machine or the processing machine using the same, the measured accuracy of the encoder is easily improved, and the positioning accuracy can be improved. Therefore, the machine properties can be improved and the quality of a processed object or a workpiece can be improved.

As described above, each of the above embodiments can provide a displacement sensing method that lowers a measured error of an encoder caused by a higher harmonic component included in an output signal of the encoder or a process error of a scale pitch. Furthermore, each of the above embodiments can provide a motor control apparatus with high accuracy by lowering a measured error of the encoder.

This application claims the benefit of Japanese Patent Application No. 2007-238695, filed on Sep. 14, 2007, which is hereby incorporated by reference herein in its entirety.

What is claimed is:

1. A displacement sensing method comprising the steps of:
   superimposing a predetermined signal on a torque command to supply a drive torque to a motor;
   measuring an amplitude spectrum ratio between the drive torque in superimposing the predetermined signal on the torque command and a motor angle measured by a displacement sensor;
   generating correction data for evening out the amplitude spectrum ratio; and
   correcting the measured motor angle so that the motor angle measured by the displacement sensor is equal to an actual motor angle using the correction data.

2. A motor control apparatus comprising:
   a displacement sensor that measures a displacement amount of a motor;
   a drive unit that supplies a drive torque to the motor;
   a signal generator that generates a predetermined signal and supplies the predetermined signal to the drive unit;
   a correction data generator that generates correction data using the drive torque when the predetermined signal is supplied to the drive unit and the displacement amount of the motor measured by the displacement sensor; and
   a correction unit that corrects the measured displacement amount of the motor so that the displacement amount of the motor measured by the displacement sensor is equal to an actual displacement amount of the motor using the correction data generated by the correction data generator,
   wherein the drive unit uses a displacement amount corrected by the correction unit to control the motor.

3. A motor control apparatus according to claim 2, wherein the predetermined signal is a sine wave signal.

4. A motor control apparatus according to claim 2, wherein the correction data generated by the correction data generator is a correction data for evening out the amplitude spectrum ratio obtained using the drive torque and the displacement amount of the motor measured by the displacement sensor.

5. A motor control apparatus according to claim 2, wherein the displacement sensor is an encoder.

6. A processing machine comprising the motor control apparatus according to claim 2.

7. A displacement sensing method comprising:
superimposing a predetermined signal on a torque command to supply the superimposed torque command to a motor with the motor controlled such that the motor has each of a plurality of rotation angles;
measuring a ratio between a component, corresponding to the predetermined signal, of an amplitude spectrum of the superimposed torque command and a component, corresponding to the predetermined signal, of an amplitude spectrum of a rotation angle of the motor measured by a sensor, with respect to each of the plurality of rotation angles;
generating correction data such that the correction data evens out the ratios over the plurality of rotation angles; and
correcting a rotation angle of the motor measured by the sensor using the correction data.

8. A motor control apparatus comprising:
a sensor configured to measure a rotation angle of a motor;
a drive unit configured to supply a torque command to the motor;
a signal generator configured to generate a predetermined signal to superimpose the generated predetermined signal on the torque command and supply the superimposed torque command to the motor with the motor controlled such that the motor has each of a plurality of rotation angles;
a correction data generator configured to generate correction data, based on a ratio between a component, corresponding to the predetermined signal, of an amplitude spectrum of the superimposed torque command and a component, corresponding to the predetermined signal, of an amplitude spectrum of a rotation angle of the motor measured by the sensor, such that the correction data evens out the ratios over the plurality of rotation angles; and
a correction unit configured to correct a rotation angle of the motor measured by the sensor using the generated correction data, wherein the drive unit is configured to supply the torque command to the motor based on the corrected rotation angle.

9. A motor control apparatus according to claim 8, wherein the predetermined signal is a sine wave signal.

10. A motor control apparatus according to claim 8, further comprising:
a first Fourier transform unit configured to obtain the amplitude spectrum of the superimposed torque command; and
a second Fourier transform unit configured to obtain the amplitude spectrum of the rotation angle of the motor measured by the sensor.

11. A motor control apparatus according to claim 8, wherein the sensor is an encoder.

12. A processing machine comprising the motor control apparatus according to claim 8.

13. An actuator control apparatus comprising:
a sensor configured to measure a displacement output of an actuator;
a drive unit configured to supply a command to the actuator to drive the actuator;
a signal generator configured to generate a predetermined signal to superimpose the generated predetermined signal on the command and supply the superimposed command to the actuator with the actuator controlled such that the actuator has each of a plurality of displacement outputs;
a correction data generator configured to generate correction data, based on a ratio between a component, corresponding to the predetermined signal, of an amplitude spectrum of the superimposed command and a component, corresponding to the predetermined signal, of an amplitude spectrum of a displacement output of the actuator measured by the sensor, such that the correction data evens out the ratios over the plurality of displacement outputs; and
a correction unit configured to correct an output of the sensor using the generated correction data, wherein the drive unit is configured to supply the command to the actuator based on the corrected output.

14. A processing machine comprising the actuator control apparatus according to claim 13.

* * * * *